(12) United States Patent
Kühnel et al.

(10) Patent No.: US 10,539,094 B2
(45) Date of Patent: Jan. 21, 2020

(54) PISTON FOR AN INTERNAL COMBUSTION ENGINE

(71) Applicant: KS Kolbenschmidt GmbH, Neckarsulm (DE)

(72) Inventors: Robert Kühnel, Erfurt BüBleben (DE); Holger Germann, Heilbronn (DE); Edward Werninghaus, Bad Friedrichshall (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 72 days.

(21) Appl. No.: 15/776,169

(22) PCT Filed: Nov. 15, 2016

(86) PCT No.: PCT/EP2016/077740
§ 371 (c)(1),
(2) Date: May 15, 2018

(87) PCT Pub. No.: WO2017/085061
PCT Pub. Date: May 26, 2017

(65) Prior Publication Data
US 2019/0285024 A1    Sep. 19, 2019

(30) Foreign Application Priority Data
Nov. 17, 2015 (DE) .................. 10 2015 222 688

(51) Int. Cl.
*F02F 3/00* (2006.01)
*B23K 1/00* (2006.01)
(Continued)

(52) U.S. Cl.
CPC ............ *F02F 3/003* (2013.01); *B23K 1/0008* (2013.01); *F02F 3/22* (2013.01);
(Continued)

(58) Field of Classification Search
CPC ...... F02F 3/003; F02F 2003/0053; F02F 3/22; B23K 1/0008; B23K 2101/003; B23P 6/02; B23P 15/10; B23P 15/105
See application file for complete search history.

(56) References Cited

U.S. PATENT DOCUMENTS

| 7,971,355 B2 * | 7/2011 | Scharp ................... F02F 3/003 29/418 |
| 2006/0207424 A1 * | 9/2006 | Gaiser ..................... F02F 3/003 92/222 |

(Continued)

FOREIGN PATENT DOCUMENTS

| DE | 102007044106 A1 | 3/2009 |
| DE | 10 2008 038 325 A1 | 6/2009 |

(Continued)

*Primary Examiner* — Syed O Hasan
(74) *Attorney, Agent, or Firm* — Young Basile Hanlon & MacFarlane, P.C.

(57) ABSTRACT

A piston for an internal combustion engine includes a lower portion and an upper portion. An upper joining plane is positioned between the upper and lower extending through the outer circumference of the piston. At least one lower joining plane is positioned between the upper and lower portions. A solder gap is defined in the upper and lower joining planes wherein a solder containing iron is inserted to fixedly join the upper and lower portions together. Methods for producing pistons through connection of the lower portion to the upper portion with solder are also disclosed.

14 Claims, 4 Drawing Sheets

(51) Int. Cl.
*F02F 3/22* (2006.01)
*B23K 101/00* (2006.01)
*B23P 15/10* (2006.01)
*B23P 6/02* (2006.01)

(52) U.S. Cl.
CPC ........... *B23K 2101/003* (2018.08); *B23P 6/02* (2013.01); *B23P 15/10* (2013.01); *B23P 15/105* (2013.01); *F02F 2003/0053* (2013.01)

(56) References Cited

U.S. PATENT DOCUMENTS

| | | | | |
|---|---|---|---|---|
| 2010/0307445 | A1* | 12/2010 | Kortas | F02F 3/003 123/193.6 |
| 2012/0222645 | A1 | 9/2012 | Edel et al. | |

FOREIGN PATENT DOCUMENTS

| | | |
|---|---|---|
| EP | 2 025 441 A1 | 2/2009 |
| WO | 2011006469 A1 | 1/2011 |
| WO | 2014029878 A1 | 2/2014 |

* cited by examiner

PISTON FOR AN INTERNAL COMBUSTION ENGINE

TECHNICAL FIELD

The invention relates to a piston for internal combustion engines and a plurality of methods for producing a piston.

The piston involved is produced by materially engaging joining of a lower portion to an upper portion to form a piston blank and subsequent processing of the piston blank to form the piston.

BACKGROUND

WO 2011/006469 A1 sets out a multiple-part piston for an internal combustion engine and a method for producing such a piston. The method for producing a multiple-part piston for an internal combustion engine comprises the following method steps: producing an upper piston portion and a lower piston portion each having an inner support element having joining faces and an outer support element having joining faces, applying a high-temperature solder material in the region of at least one joining face, assembling the upper piston portion and the lower piston portion to form a piston member by producing contact between the joining faces, bringing the piston member to a vacuum furnace and evacuating the vacuum furnace, heating the piston member at a pressure of a maximum of $10^{-2}$ mbar to a soldering temperature of a maximum of 1300° C. and cooling the soldered piston at a pressure of a maximum of $10^{-2}$ mbar until complete hardening of the high-temperature solder material. WO 2011/006469 A1 further relates to a multiple-part piston which can be produced with this method for an internal combustion engine, in which annular inner support elements which delimit an outer peripheral cooling channel and an inner cooling chamber are provided.

DE 10 2008 038 325 A1 proposes a method for fixing an annular element to a piston for an internal combustion engine, in which the annular element is screwed onto the piston base member by means of a thread which is fitted to the radial outer face of a portion of the piston base, an upwardly open, peripheral groove is formed in the piston base in the region of the thread, the groove is filled with solder material, the piston is heated until the solder material fluidizes and flows between the thread turns of the thread, and subsequently the piston is cooled. There is thereby produced a screw connection between the piston base member and the annular element. A screw connection requires additional components and is time-consuming to produce.

Welding (laser welding, friction welding) for joining the lower portion and upper portion to form a piston including stress-free annealing with subsequent, additional heat treatment (quenching and tempering) is time and cost-intensive.

In the prior art, in one operating step the formation of the materially engaging connection is carried out between the lower portion and the upper portion of a piston blank or piston, in particular as a solder connection. In at least one additional operating step, the heat treatment is carried out to form the provided ferritic/carbidic structure, the quenching and tempering. This requires a double introduction of heat into the piston structure and is time-consuming.

SUMMARY

An object of the invention is therefore to provide a piston blank and a piston which is produced therefrom and which does not have the above-mentioned disadvantages and a plurality of methods for producing a corresponding piston blank or piston, respectively.

This object is achieved by a piston blank, a piston and a plurality of methods having the features of the independent patent claims.

There is provided according to the invention a piston blank for producing a piston for internal combustion engines which comprises a lower portion and an upper portion, wherein there is constructed between the portions at least one upper joining plane which extends through the outer periphery of the piston blank, wherein an upper lower-portion joining face and an upper upper-portion joining face are constructed opposite each other in the region of the upper joining plane and/or there is constructed between the portions at least one lower joining plane which does not extend through the outer periphery of the piston blank, wherein a lower lower-portion joining face and a lower upper-portion joining face are constructed opposite each other in the region of the lower joining plane, wherein at least in a part-region of the at least one joining plane at least one solder gap is arranged between the joining faces, wherein a centering is provided for the positionally correct arrangement of the lower portion and the upper portion in at least one solder gap. As a result of this arrangement of the at least one joining face, it is preferably located at the outer edge of the annular field and even outside the annular field in the direction counter to the bolt holes. The solder gap constructed in the joining face is consequently readily accessible from the periphery of the piston blank. Furthermore, the at least one joining face is located in a region which is removed from the piston blank during the provision of the combustion chamber cavity. Consequently, it is also possible for the cavity neck and the cavity edge of the combustion chamber cavity to be constructed integrally. Solder for constructing a materially engaging connection between the lower portion and upper portion of the piston blank can be introduced into this at least one solder gap.

The term "upper" describes elements or regions which are located in relation to the upper joining plane of the piston blank or the piston. Consequently, the upper lower-portion joining face, the upper upper-portion joining face and the upper solder gap are intended to be associated with the upper joining plane. The term "lower" accordingly describes elements or regions which are located in relation to the lower joining plane of the piston blank or the piston. Consequently, the lower lower-portion joining face, the lower upper-portion joining face and the lower solder gap are intended to be associated with the lower joining plane.

Furthermore, there is provision according to the invention for the gap dimension between the lower portion and the upper portion of the at least one solder gap to be between 0.05 mm and 0.5 mm, preferably between 0.1 mm and 0.4 mm. The quantity of the solder used can thereby be varied. The solder quantity can be adjusted in accordance with the subsequent stress of the piston in the respective internal combustion engine. The term "stress" is intended to be understood to mean different loads resulting from the use of the internal combustion engine having a corresponding piston in different vehicles, such as, for example, trucks, passenger vehicles, traction vehicles, locomotives or ships.

Furthermore, there is provision according to the invention for the centering to have the gap dimension X. Advantageously, the gap dimension for the at least one solder gap is produced by the centering. The centering is preferably located in a region of the at least one joining face which is removed during the provision of the combustion chamber cavity of the piston. As a result of the centering, a positive-locking connection is brought about between the corresponding diameters of the lower portion and the upper portion of the piston blank.

Furthermore, there is provision according to the invention for a pressure compensation element which opens in at least one solder gap to be provided on the upper portion of the piston blank. The pressure compensation element supports the solder flow into the at least one solder gap. It is thereby ensured that no air inclusions are present in the region of the materially engaging connection between the lower portion and the upper portion of the piston blank or the resultant piston. Excess solder is removed with the pressure compensation element during the production of the combustion chamber cavity. Consequently, a reliable, highly resistant connection between the lower portion and upper portion of the piston is produced.

Alternatively or additionally, there is provision for a pressure compensation element which permanently remains in the lower portion and preferably opens in a cooling channel to be provided on the lower portion of the piston blank. The above-described advantages, with particular regard to the solder flow, are also thereby produced.

Furthermore, there is provision according to the invention for the pressure compensation element to be arranged diagonally in relation to the piston stroke axis. When the joining process is carried out, the lower portion is preferably arranged above the upper portion. Consequently, the diagonal arrangement of the pressure compensation element supports the flow of the solder. Consequently, the solder flows with gravitational support in addition to capillary effects.

There is provided according to the invention a piston for internal combustion engines which comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, wherein iron-containing solder is introduced in the region of the at least one joining plane between the lower portion and the upper portion. Iron-containing solder, for example Fe solder, allows the solder process and the quenching and tempering process to be carried out in one operating step.

Furthermore, there is provision according to the invention for the lower portion and/or the upper portion to comprise tempering steel and/or microalloyed steel and/or AFP steel and/or bainitic steel. The above-mentioned steel types are suitable for processes for changing the grain structure. In accordance with the intended application of the piston in an internal combustion engine, a suitable steel type can thereby be selected and heat-treated. In accordance with the power and the loading of the piston during operation of the internal combustion engine, a suitable steel type can be selected. A description of the steel types and the suitability thereof for being used to produce pistons for internal combustion engines is carried out in the following text.

There are further set out preferred solder materials which are composed of different alloying elements. These solder materials have particularly advantageous effects in connection with the materials tempering steel and/or microalloyed steel and/or AFP steel and/or bainitic steel because a simple joining process is thereby produced and the two joined components remain joined together durably during operation under high stresses.

A method is provided according to the invention for producing a piston for an internal combustion engine using a tempering steel, which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) carrying out a tempering process for the piston blank, by quenching and subsequently annealing, h) the tempering process is finished when the piston blank has a temperature of less than 200° C. and preferably a tempering structure and a hardness of >310 HB.

Alternatively, a method is provided according to the invention for producing a piston for an internal combustion engine using a microalloyed and/or bainitic steel, which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) continuous cooling of the piston blank at cooling rates between 0.25 and 5 K/s in order to pass through the bainitic region or ferrite/pearlite region, h) the cooling operation is finished when the piston blank has a temperature of less than 200° C. and preferably a ferritic/pearlitic and/or bainitic grain structure is present.

Alternatively, a method is provided according to the invention for producing a piston for an internal combustion engine using a microalloyed and/or bainitic steel, which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) continuous cooling of the piston blank at cooling rates between 0.25 and 5 K/s to an isothermal conversion temperature between 350 and 650° C. with subsequent isothermal maintenance in order to pass through the bainitic region or ferrite/pearlite region, h) the cooling operation is finished when the piston blank has a temperature of less than 200° C. and preferably has a ferritic/pearlitic and/or bainitic grain structure.

Alternatively, a method is provided for producing a piston for an internal combustion engine using a microalloyed and/or bainitic steel, which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) continuous cooling of the piston blank with cooling gradients between 250 and 10 K/s to an isothermal conversion temperature between 350 and 650° C. with subsequent isothermal maintenance, h) the cooling operation is finished when the piston blank has a temperature of less than 200° C. and preferably has a ferritic/pearlitic and/or bainitic grain structure.

Alternatively, a method is provided for producing a piston for an internal combustion engine using a precipitation-hardened ferritic/pearlitic steel (AFP steel), which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) continuous cooling of the piston blank at cooling rates between 5 and 45 K/min in order to pass through the bainitic region or ferrite/pearlite region, h) the cooling operation is finished when the piston blank has a temperature of less than 200° C. and preferably a ferritic/pearlitic and/or bainitic grain structure is produced.

Alternatively, a method is provided for producing a piston for an internal combustion engine using a precipitation-hardened ferritic/pearlitic steel (AFP steel), which piston comprises a lower portion and an upper portion, wherein there is constructed between the portions at least one upper joining plane which extends through the outer periphery of the piston, wherein an upper lower-portion joining face and an upper upper-portion joining face are constructed opposite each other in the region of the upper joining plane and/or there is constructed between the portions at least one lower joining plane which does not extend through the outer periphery of the piston, wherein a lower lower-portion joining face and a lower upper-portion joining face are constructed opposite each other in the region of the lower joining plane, wherein at least one solder gap is arranged in at least one part-region of the at least one joining plane between the joining faces, having the following method steps:

a) producing a lower portion and an upper portion with at least one joining face, b) applying a solder in the region of at least one joining face, c) assembling the lower portion and the upper portion to form a piston blank by producing contact between the at least one joining face, wherein there is no contact in the region of the at least one solder gap, d) heating to a temporary holding temperature of from 825° C. to 1000° C. in order to homogenize the temperature of the portions directly before reaching the actual operating temperature, e) heating the piston blank to a temperature of from 1100 to 1200° C. in order to carry out a materially engaging solder connection, f) cooling the piston blank to a temperature of from 900 to 1000° C., g) continuous cooling of the piston blank at cooling rates between 5 and 45 K/min to an isothermal conversion temperature between 350 and 650° C. with subsequent isothermal maintenance in order to pass through the bainitic region or ferrite/pearlite region, h) the cooling operation is finished when the piston blank has a temperature of less than 200° C. and preferably a ferritic/pearlitic and/or bainitic grain structure is produced.

The above-described methods allow the joining step for the lower portion and the upper portion of the piston blank or the piston to be carried out in one method. The quantity of heat introduced for the soldering connection is also used to form the desired grain structure in the piston. Consequently, there are saved handling time, energy and process time with respect to the entire production process. This results in a substantial reduction of the production costs for the respective piston.

There is further provision according to the invention for the isothermal maintenance to be carried out between 5 and 30 minutes, preferably between 10 and 20 minutes. It is thereby ensured that the desired structure is formed in the piston.

There is further provision according to the invention for at least the method steps e, f and g to be carried out in a vacuum furnace. The flow of the solder is thereby supported inside the at least one solder gap. This supports the production of a connection between the lower portion and upper portion of the piston or piston blank without any inclusions of air. In turn, this increases the operational reliability of the internal combustion engine with such a piston.

There is further provision according to the invention for the lower portion to be arranged above the upper portion while the method is being carried out. This arrangement supports the positioning of the lower portion relative to the upper portion because the larger mass of the lower portion acts in the direction of gravitational force.

There is further provision according to the invention for the solder to move into the at least one solder gap by a pressure compensation element under the action of the capillary effect and/or atmospheric pressure. The pressure compensation element effectively supports the flow of the solder inside the solder connection and prevents or avoids at least the formation of air inclusions in the solder connection.

There is further provision according to the invention for the positioning of the lower portion relative to the upper portion to be carried out by a centering. A precise joining of the lower portion and the upper portion is thereby possible.

In other words, as a result of the joining method according to the invention a more cost-efficient joining technology is provided with respect to the existing friction welding method and methods with a separate joining step and heat treatment step. Separate heat treatment after the joining is unnecessary because the soldering and the heat treatment are carried out in one process step.

The extent of the process control and control of the cooling parameters during forging, for example, at the premises of the raw component supplier, is simplified or reduced. There is produced a reduction of the cycle time and as a result a reduction of component costs.

With the method according to the invention for producing a piston, the production of the solder connection and the heat treatment for tempering the joined piston are carried out in one operating step.

In order to implement the method according to the invention, the following geometric measures are provided on the piston. A joining face is located in an annular region and in a combustion chamber cavity and comprises no annular groove or at least one annular groove and no cavity neck or a proportional cavity neck of this combustion chamber cavity. The adjustment of a defined solder gap is carried out by means of a centering located on the upper portion. The centering adjusts an inner and outer solder gap of, for example, 0.3 mm. Pressure compensation elements located on the upper portion ensure that the solder can move into the solder gap under the action of the capillary effect and atmospheric pressure.

The lower portion and the upper portion are soldered in the inverted state so that the mass or the inherent weight of the lower portion (main portion) can act on the upper portion (annular element). After the piston is finished, the upper portion has the annular region and is therefore also referred to as an annular element. The upper portion generally has a lower mass than the lower portion and therefore the lower portion is arranged above the upper portion for joining, when viewed along the piston stroke axis. The greater mass of the lower portion supports the formation of a positionally accurate solder connection between the lower portion and the upper portion of the piston.

The following process-technical measures are provided in order to carry out the method according to the invention. In order to construct the materially engaging connection between the lower portion and the upper portion of the piston, an iron-containing connection means, in particular an Fe solder, is provided. The upper portion and/or lower portion comprises tempering steel and/or microalloyed steel and/or AFP steel and/or bainitic steel.

The heat treatment after the soldering process has been concluded, in particular using a microalloyed and/or bainitic steel, is carried out with the following method:

continuous cooling or quenching to a temperature of from 350 to 600° C. with subsequent isothermal maintenance, process control of soldering (for tempering steel, microalloyed and bainitic steel):

soldering at approximately from 1100 to 1200° C. with subsequent cooling to approximately from 900 to 1000° C.

process control for heat treatment of piston material (for microalloyed and bainitic steel) can be carried out in 2 variations:

1.) continuous cooling with cooling gradients in order to pass through the bainitic or ferritic field 2.) continuous cooling with cooling gradients between 250 and 10 K/s to isothermal conversion temperature between 350 and 650° C. with subsequent thermal retention the piston has a ferritic/pearlitic and/or bainitic grain structure the thermal treatment after the soldering process is finished, in particular using a tempering steel, was carried out with the following method:

tempering process, that is to say, quenching and subsequently annealing the piston has a tempering structure and a hardness >310 HB.

The introduction of common rail diesel technology considerably increased the sales of vehicles with diesel engines. At the beginning of this development, the pressure in the common rail diesel internal combustion engines was approximately 1200 bar. The continuing improvement of this technology led to the development of common rail diesel internal combustion engines with pressures between 2200 and 2400 bar. The continuously increasing environmental requirements with regard to limiting and reducing emissions, such as nitrogen oxides (NOx) and carbon dioxide (CO2) and soot particulates requires increasingly clean combustion of the diesel fuel in the cylinder. This can be achieved by the efficiency of the common rail diesel internal combustion engines being increased by improving the injection technology. To this end, it is necessary to increase the injection pressure in the internal combustion engine.

The following passages relate to the suitability of types of steel for the production of pistons for internal combustion engines and the structures which are produced in the tempering process. For example, the tempering steel 42CrMo4 applies to applications of higher specific powers in pistons for internal combustion engines as a very good compromise in relation to the deformability thereof, the strength properties, non-scaling property, processability and costs thereof. Tempering steels are steels which take on a relatively high strength with good ductility at the same time as a result of a tempering processing operation (hardening operation with subsequent annealing). This group begins with the simple low-alloyed carbon steels. At small cross-sections, these materials can be brought to a greater hardness by the tempering. At greater cross-sections, however, the hardenability of the non-alloyed carbon steels is not sufficient for through-hardening as far as the core. In order also to obtain the martensitic structure formation which is generally desired in the core with greater cross-sections, the steel must be alloyed with hardenability increasing elements, such as, for example, chromium, molybdenum or nickel.

For applications of medium loading, for economic reasons microalloyed steels afford advantages in pistons for internal combustion engines. Steels which are alloyed with from 0.01 to 0.1% by mass of aluminum, niobium, vanadium and/or titanium are referred to as microalloyed in order, for example, to obtain a high level of strength by formation of carbides and nitrides and making the grains finer. Microalloyed cold forming steels are steels with a high apparent yielding point or high strength. In HSLA steels (High Strength Low Alloy), the high strength values are achieved by precipitation hardening and making the grain sizes finer with simultaneous minimization of the proportion of alloying elements. Not only does this have a positive effect on the solderability but it also ensures that in the soldering zones neither a softening of the metal nor a coarsening of the grains is produced. Low-alloyed HSLA steels are particularly suitable for the production of pistons for internal combustion engines. Depending on the apparent yielding point, all qualities of these steels are outstandingly suitable for cold forming and have an outstanding brittle fracture resistance at low temperatures. All the HSLA steels are distinguished by a good fatigue strength and a high shock resistance. As a result of these good mechanical properties, HSLA steels are suitable for producing pistons for internal combustion engines.

The steel 20MnCrMo7 (1.7911) may be mentioned as an example of a bainitic steel. In the event of cooling from the forming heat, it forms in a stable manner a structure in the lower bainite range with martensitic portions. This steel withstands operating pressures up to 3000 bar in the internal combustion engine. It is surprising that steels with a higher strength also have better ductilities. This becomes possible as a result of the fine-grained nature of the bainitic/martensitic structure in comparison with the ferrite/pearlite structure of the AFP steels.

Bainite is an intermediate stage structure, it can be produced during the heat treatment of carbon-containing steel. The term "Zwischenstufengefüge" is also used in German-speaking areas (intermediate stage structure) as a synonym for bainite. Bainite is formed at temperatures which are between those for pearlite formation or martensite formation. Unlike during the formation of martensite, in this case dislocation operations in the crystal lattice and diffusion operations are connected, thereby different conversion mechanisms are possible. As a result of the dependency of the cooling rate, carbon content, alloying elements and the resultant formation temperature, the bainite does not have a characteristic structure. Bainite comprises, similarly to pearlite, the phases ferrite and cementite (Fe3C) but differs from pearlite in terms of form, size and distribution. In principle, a distinction is made between two main structural forms, the upper bainite (also granular bainite) and lower bainite.

Bainitization or isothermal conversion in the bainite stage is an austenitization with subsequent quenching at temperatures above the martensite start temperature Ms. The cooling rate for the piston is selected in this case in such a manner that no conversion can take place in the pearlite stage. During holding at the temperature above Ms, the austenite in the piston is converted into bainite as completely as possible.

As a result of a slow dislocation of the austenite, ferrite crystals which are heavily over-saturated with carbon are produced, starting from the grain boundaries or impurities, with body centered cubic crystal lattices (bcc lattices) in the piston. The carbon is precipitated as a result of the higher diffusion speed in the bcc lattice in the form of spherical or ellipsoid cementite crystals inside the ferrite grain. Similarly, the carbon can diffuse into the austenite region of the piston and can form carbides.

The upper bainite is produced in the upper temperature range of the bainite formation, it has a needle-like structure which is very similar to martensite. As a result of the favorable conditions for the diffusion, the carbon diffuses in the piston to the grain boundaries of the ferrite needles. In this case, there are produced in the piston irregular and interrupted cementite crystals. As a result of the irregular distribution, the structure in the piston often has a granular appearance. In the case of inadequate metallographic analysis, the structure can easily be confused with pearlite or the Widmanstätten structure.

The lower bainite is produced in the piston only during continuous cooling in the lower temperature range of the bainite formation. As a result of ferrite formation, the austenite becomes enriched with carbon, during subsequent cooling the austenite regions are converted in the piston into ferrite, cementite, needle-like bainite and martensite. As a result of the bainitization, inherent stresses in the piston are reduced and the ductility is increased so that this method is advantageous for crack-susceptible steels and pistons which are formed in a complex manner The deformation and strength behavior of a piston is considered in greater detail below. The isothermal bainite conversion affords a number of advantages. In the region of the lower bainite, very good ductility properties in the piston are achieved in addition to high strengths, as shown for steels with a carbon content of from 0.1 to 1%. In this case, the chromium content was varied from 0 to 1% and the silicon content was varied from 0.1 to 0.6%. At conversion temperatures of from 400 to 600° C., an apparent yielding point ratio of from 0.6 to 0.8 was established. For tensile strengths over 850 N/mm2, the steels converted in the bainite stage had a superior ductility with respect to normally tempered steels. These very good mechanical properties of the bainite are maintained as far as the lowest temperatures. Furthermore, the breaking elongation, contraction at breaking and impact strength when notched are higher than in the case of comparable strength after normal tempering. The creep strength, fatigue limit and fatigue strength are also favorably influenced by this heat treatment method.

Materials for pistons with bainitic structure states afford advantages in terms of the fatigue limit and fatigue strength. It can be shown that the fatigue limit of bainitically converted samples is above that of tempered samples with comparable tensile strength. In this case, a bainitic conversion which is as complete as possible must be ensured. In this case, the bainitic structure is distinguished in that it can effectively diminish stress peaks which are produced by inner or outer notches and cracks.

However, the conversion in the bainitic stage is advantageous not only as a result of the good mechanical properties for pistons, but also from the point of view of a low-distortion heat treatment which is practically free from hardening cracks. As a result of the relatively high conversion temperatures, both the quenching stresses and the conversion stresses are much lower than in the case of conventional hardening. Furthermore, the conversion in the bainite stage is connected with substantially smaller changes of volume than the martensitic conversion. The microstructural definition of the bainite is considered in this case for iron-based materials bainite to be a non-lamellar product of the eutectoid decay comprising ferrite and carbide. The two product phases are formed in temporal succession with diffusion control, wherein the carbides are precipitated either in the ferrite first formed or at the boundary face thereof.

Martensite is a metastable structure of solid bodies which is produced from the initial structure without diffusion and athermally by a cooperative shearing movement. Cooperative movement means that the martensite lattice is produced only by ordered angles and positional changes from the initial lattice. The individual atoms move in this case only by fractions of the inter-atomic distance. The middle rib (referred to as the invariant habitus plane) of each martensite plate produced does not participate in the dislocation. The martensitic conversion is a frequently used possible method of influencing properties for steels.

In the steel of the piston, martensite is produced by a diffusionless dislocation operation from the face centered cubic lattice of the austenite in an hdP (hexadiagonal densest packing) lattice, during the rapid cooling to a temperature below the martensite start temperature. The conversion stops when the cooling is stopped. If the martensite finish temperature is reached, the volume proportion of the martensite does not continue to increase with further cooling.

AFP steels also afford advantages for economic reasons for applications in pistons for internal combustion engines with medium loading. Precipitation-hardening ferritic/pearlitic steels (AFP steels) are substantially carbon steels which are additionally alloyed with approximately from 0.1 to 0.4% of vanadium. If the piston is hot-forged, during the hot forging operation at approximately 1250° C. the grain structure thereof is austenitic and the vanadium is completely dissolved in the austenite lattice. After the forging operation of the piston, the austenite is converted by controlled cooling in air first partially into the ferritic grain structure and then, with further decreasing temperature, additionally into the pearlitic grain structure. This corresponds to the operations which are also carried out with simple carbon steels during the cooling. However, the microalloyed AFP steels consequently have an additional effect: in the ferrite/ferrite-pearlite structure, the vanadium has a substantially lower solubility so that a substantial precipitation pressure is produced. Since the element can also still diffuse sufficiently at lower temperatures, precipitations are formed: the vanadium is connected to carbon and where applicable nitrogen to form vanadium carbides or carbonitrides. These precipitations which are responsible for the increase in strength are distributed uniformly in the entire structure and have dimensions in the one or two-digit nanometer range. As a result, they can effectively impede the movement of dislocations (precipitation solidification). Consequently, the apparent yielding point and tensile strength of these steels with respect to comparable alloys without vanadium substantially increase. Only ferritic and pearlitic regions can be seen under a light-optical microscope. The strength-enhancing precipitations can be made visible only under the transmission electron microscope. As a result, strength values for pistons which extend into the range of tempering steels can be obtained with this steel group without a hardening and annealing operation having to be carried out but advantageously being able to be carried out. Since the quenching operation which is conventional in the context of a heat treatment is omitted, hardness cracks also cannot be produced so that the pistons also do not have to be checked for cracks. The cooperation of more cost-effective alloying layer and the omission of a tempering treatment and the checking for cracks results in significant cost savings with respect to the tempering steels.

Austenite is the metallographic designation for the face centered cubic modification (phase) of pure iron and the mixed crystals thereof. The austenitic phase (defined by the face centered cubic lattice structure) occurs between the temperatures 1392° C. and 911° C. as γ iron in pure iron. During cooling, it is formed from the δ-ferrite by a polymorphous conversion. If carbon is added as an alloying element, the austenite is present as a mixed interposed crystal. The face centered cubic austenite lattice has octaeder gaps with a radius of 0.41 R. In spite of the greater packing density, therefore, austenite is capable of dissolving substantially more carbon atoms than the bcc ferrite lattice. The carbon solubility of the austenite is 0.8% at a temperature of 723° C. The maximum solubility is 2.06% of carbon at 1147° C. The diffusion speed in the austenite is less than in the ferrite. The austenitic phase has paramagnetic properties, it is not magnetizable.

Ferrite is the metallographic designation for the body centered cubic modification (phase) of pure iron and the mixed crystals thereof.

Cementite is a compound of iron and carbon having the composition Fe3C (iron carbide) and occurs as a metastable phase in steel.

The pearlite is a eutectoid structural component of steel arranged in a lamellar manner. It is a phase mixture of ferrite and cementite which occurs as a result of coupled crystallization in iron/carbon alloys at carbon contents between 0.02% and 6.67%. The eutectoid point (100% conversion to pearlite) is at 0.83% of carbon and 723° C. Up to 2.06% of carbon, the pearlite is present as a separate structural component, above 2.06% of carbon it is a component of the ledeburite II (eutectic structure).

BRIEF DESCRIPTION OF THE DRAWINGS

Embodiments of the invention are shown in the Figures and described below. In the drawings.

DETAILED DESCRIPTION

Figure 1:
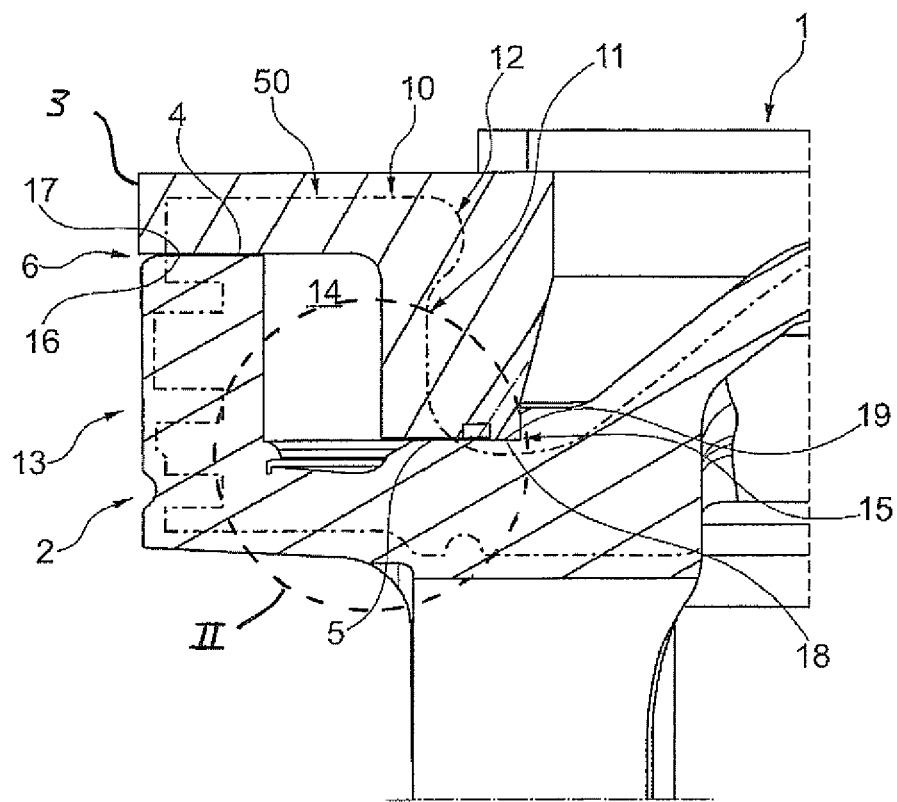
FIG. 1 is a cutout of a piston blank.

In the following description of the Figures, terms such as top, bottom, above, below, left, right, front, rear, etc., relate exclusively to the exemplary illustration selected in the respective Figures and position of the device and other elements. These terms are not intended to be understood in a limiting manner, that is to say, these terms may change as a result of different positions and/or mirror-symmetrical configuration or the like.

The same elements are given the same reference numerals in all the Figures.

FIG. 1 shows a cutout of a piston blank 1 having a lower portion 2 and an upper portion 3. An upper joining plane 6 is arranged between the lower portion 2 and upper portion 3. This upper joining plane 6 is arranged in the outer periphery of a cooling channel 14 or outside the cooling channel 14. In the region of the upper joining plane 6, an upper lower-portion joining face 16 is constructed on the lower portion 2 and an upper upper-portion joining face 17 is constructed on the upper portion 3 opposite each other. An upper solder gap 4 is at least partially constructed between the upper lower-portion joining face 16 and the upper upper-portion joining face. Furthermore, a lower joining plane 15 is arranged between the lower portion 2 and the upper portion 3. This joining plane is arranged in the inner periphery of the cooling channel 14 or outside the cooling channel 14. In the region of the lower joining plane 15, there are constructed opposite each other a lower lower-portion joining face 18 on the lower portion 2 and a lower upper-portion joining face 19 on the upper portion 3. A lower solder gap 5 is at least partially constructed between the lower lower-portion joining face 18 and the lower upper-portion joining face 19.

Figure 2:
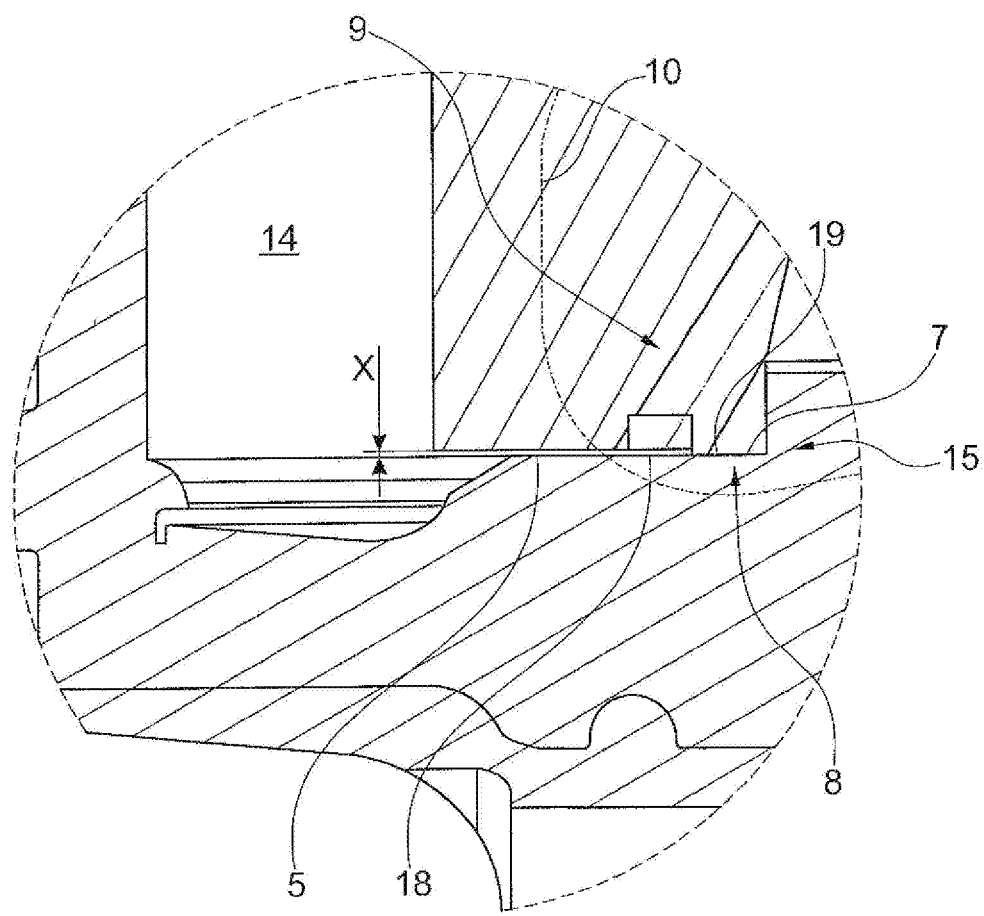
FIG. 2 shows an enlarged detail according to II in FIG. 1.

The lower portion 2 and upper portion 3 are joined in a materially engaging manner to form the piston blank 1, to this end the upper solder gap 4 and the lower solder gap 5 are provided between the two portions 2, 3. The lower solder gap 5 has a gap dimension X which is depicted in FIG. 2. The gap dimension X is, for example, 0.1 mm FIG. 2 shows the detail designated II in FIG. 1 in the region of the lower solder gap 5. A stop 7 is constructed in the region of the lower joining plane 15 between the lower portion 2 and upper portion 3. A centering 8 of the portions 2, 3 relative to each other is carried out by positive-locking engagement of the corresponding diameters of the lower portion 2 and upper portion 3. A pressure compensation element 9 in the form of a hole is arranged in the region of the lower solder gap 5. In the joining position of the piston blank 1, illustrated in FIG. 3, this pressure compensation element 9 is directed in relation to the piston stroke axis diagonally downward so that the gravitational force can act on the solder. The force action F is depicted in FIG. 3.

Figure 3:
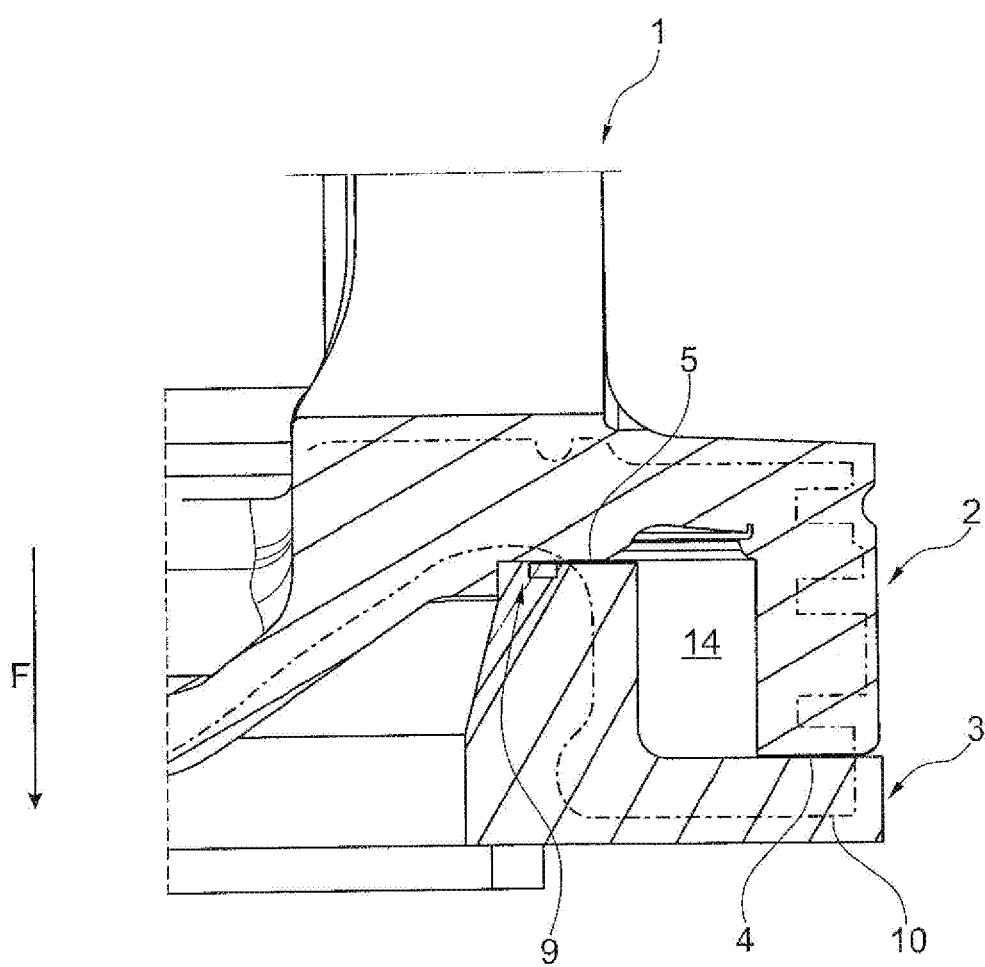
FIG. 3 is a cutout of a piston blank oriented in the joining position.

A finished contour 10 is depicted as a broken line in FIGS. 1, 2 and 3. This finished contour 10 describes the progression of the delimitation line of the piston 50 which is intended to be produced from the piston blank 1 and which is only illustrated here by means of the contour thereof for an internal combustion engine. FIG. 2 particularly shows that the region with the stop 7, the centering 8 and the pressure compensation element is provided only to join the lower portion 2 and upper portion 3 and is removed in a subsequent step to form a combustion chamber cavity. FIG. 1 illustrates a subsequent cavity neck 11 and a subsequent cavity edge 12 of this combustion chamber cavity. The annular region 13 which is not yet produced from the piston blank 1 is also shown. An annularly peripheral cooling channel 14 is located adjacent to this future annular region 13 in the direction of the central piston stroke axis.

Equilibrium diagrams describe equilibrium relationships in alloys, for example, the Fe—Fe3C graph in the system iron/carbon, which are produced only in the case of very slow temperature changes. During the technical heat treatment, however, rapid temperature changes occur during the process control. Since the diffusion of the elements is a time-dependent variable, the heating or cooling rate has a considerable influence on the crystalline state of the metal material. This means that phase diagrams can be applied only partially to the respective heat treatment methods because they do not always reflect the type and composition of the phases during the temperature control.

Figure 4:
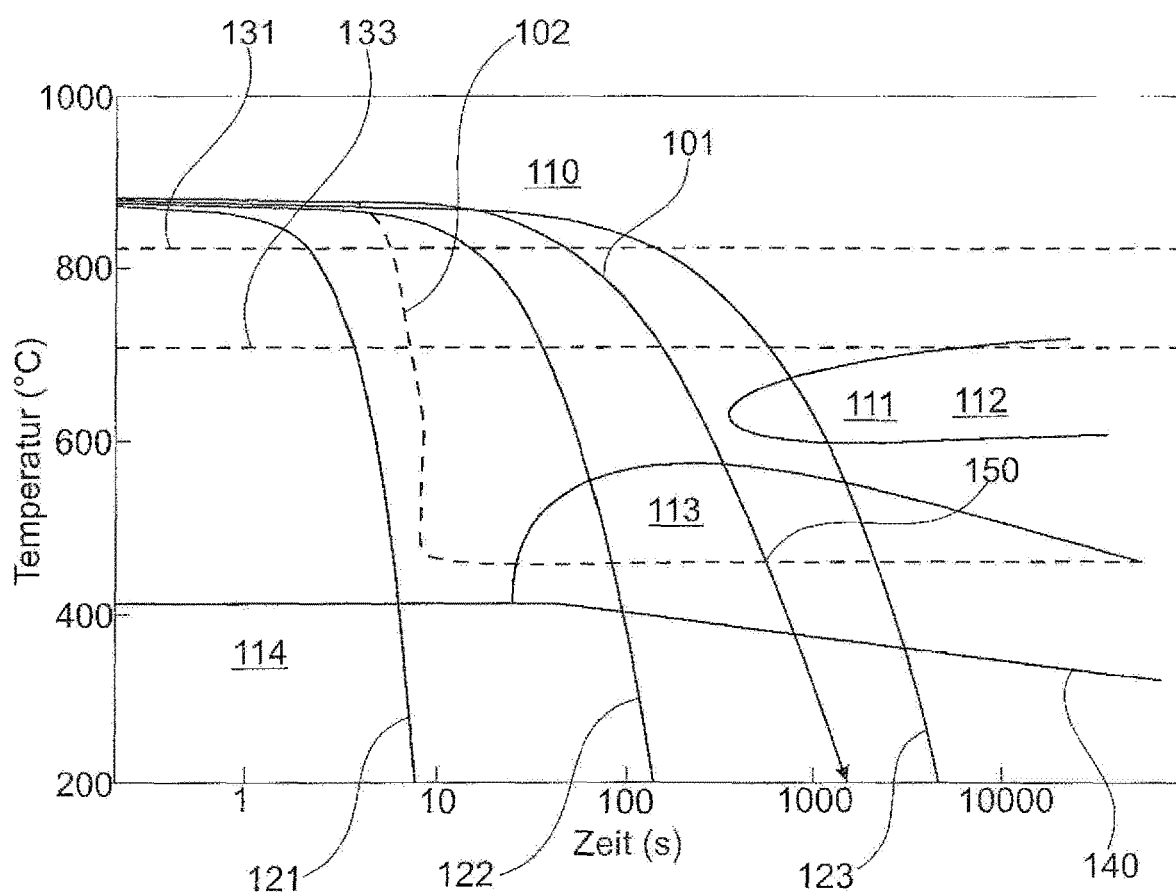
FIG. 4 shows a graph which is referred to as a time/temperature conversion chart (TTC).

Therefore, there is used a different depiction method which considers the time-dependency of the conversions. In order to depict the time-dependency of the phase conversions, therefore, a time/temperature conversion (TTC) graphical representation is selected as the graph (FIG. 4). In the TTC graph, the structural development for different temperature progressions and cooling routes during the heat treatment of a piston for internal combustion engines can be followed. In principle, a distinction is made between the isothermal and continuous TTC graph. A continuous TTC graph is illustrated in FIG. 4. After the austenitization, the piston is cooled at different cooling rates as far as ambient temperature. In this case, the conversion points are noted. Furthermore, at the end of the cooling line the achievable hardness is usually also noted. The cooling rate which is intended to be sought during the quenching treatment of an austenitized steel can be assessed on the basis of continuous time/temperature conversion graphical representations. In such a graph (FIG. 4 shows one), the structure states which occur along specific cooling lines are noted within the piston as a function of the temperature and time. In FIG. 4, an austenite region 110, a ferrite region 111, a pearlite region 112, a bainite or intermediate stage region 113 and a martensite region 114 occur. Furthermore, FIG. 4 shows a high cooling rate 121, an increased cooling rate 122 and a slow cooling rate 123. A first holding point is also illustrated during the heating 131 (Ac 1, c=chauffage/heating) of the piston material and a third holding point is shown during the heating 133 (Ac 3, c=chauffage/heating) of the piston material. Furthermore, a limit 140 is depicted and the structural conversion is finished if a value falls therebelow.

FIG. 4 illustrates cooling routes 101, 102. The cooling route 101 constitutes a continuous cooling operation. In this case, the target region in the time/temperature conversion (TTC) graphical representation is passed through in a controlled manner in order to adjust the intended structure. The cooling operation takes place in the vacuum furnace. The target region bainite for bainitic steels is targeted at a cooling rate of from 0.25 to 5 K/s (Kelvin per second). The resultant mixed structure has portions of lower and upper bainite. The target region ferrite/pearlite for precipitation-hardened ferritic/pearlitic steels (AFP steels) is targeted at cooling rates of from 5 to 45 K/min.

The cooling route 102 constitutes a cooling to the isothermal conversion temperature between 350 and 650° C. and subsequent holding. With respect to the cooling route 101, there is advantageously produced a homogeneous structure because only one temperature range is passed through during the phase conversion. The cooling to an isothermal conversion temperature is carried out at cooling rates of from 250 to 10 K/s for an isothermal maintenance time of at least 15 minutes. In the cooling route 102, it is possible to selectively adjust the mixed structure comprising lower and upper bainite. The cooling operation takes place in the vacuum furnace.

Alternatively, a combination of the cooling routes 101 and 102 is also conceivable, in this case the cooling route 101 is followed as far as the intersection point 150 of the cooling routes 101 and 102 and from the intersection point 150 the cooling route 102 is further followed. In this case, the temperature is held for at least 15 minutes isothermally from the intersection point 150.

If a value falls below the limit 140, the structure conversion is finished.

LIST OF REFERENCE NUMERALS

1 Piston blank
2 Lower portion
3 Upper portion
4 Upper solder gap
5 Lower solder gap
6 Upper joining plane
7 Stop
8 Centering
9 Pressure compensation element
10 Finished contour
11 Cavity neck
12 Cavity edge
13 Annular region
14 Cooling channel
15 Lower joining plane
16 Upper lower-portion joining face
17 Upper upper-portion joining face
18 Lower lower-portion joining face
19 Lower upper-portion joining face
50 Piston
101 Cooling route, continuous cooling
102 Cooling route, cooling to isothermal conversion temperature
110 Austenite
111 Ferrite
112 Pearlite
113 Bainite (intermediate stage structure)
114 Martensite
121 High cooling rate
122 Increased cooling rate
123 Slow cooling rate
131 Ac 1 first holding point during heating (c=chauffage/heating)
133 Ac 3 third holding point during heating (c=chauffage/heating)
140 Limit
150 Intersection point
X Gap dimension
F Force action

The invention claimed is:

1. A method for producing a piston for use in an internal combustion engine using a tempering steel, the piston comprising a lower portion and an upper portion defining at least one of upper joining plane which extends through the outer periphery of the piston or a lower joining plane which does not extend through the outer periphery of the piston, and at least one solder gap positioned in a portion of the at least one upper joining plane or the lower joining plane, the method comprising the steps of:
  a) producing a lower portion and an upper portion having at least one of an upper joining plane or a lower joining plane between the lower portion and the upper portion;
  b) applying a solder in a region of the at least one upper joining plane or the lower joining plane;
  c) assembling the lower portion and the upper portion to form a piston blank by producing contact between the upper portion and the lower portion in a portion of the at least one upper joining plane or the lower joining plane, wherein there is no contact between the upper portion and the lower portion in a region of the at least one solder gap;
  d) heating the piston blank to a temporary holding temperature of from 825° C. to 1000° C. in order to homogenize the temperature of the upper and lower portions directly before reaching an actual operating temperature;
  e) heating the piston blank to a temperature of from 1100 to 1200° C. thereby producing a materially engaging solder connection;
  f) cooling the piston blank to a temperature of from 900 to 1000° C.;

g) tempering the piston blank by quenching and subsequently annealing; and
h) stopping the tempering when the piston blank has a temperature of less than 200° C. and a tempering structure and a hardness of >310 HB.

2. A method for producing a piston for use in an internal combustion engine using at least one of a microalloyed or bainitic steel, the piston comprising a lower portion and an upper portion defining at least one of upper joining plane which extends through the outer periphery of the piston or a lower joining plane which does not extend through the outer periphery of the piston, and at least one solder gap positioned in a portion of the at least one upper joining plane or the lower joining plane, the method comprising the steps of:
  a) producing a lower portion and an upper portion with at least one of an upper joining plane or a lower joining plane;
  b) applying a solder in a region of the at least one upper joining plane or the lower joining plane face;
  c) assembling the lower portion and the upper portion to form a piston blank by producing contact between the upper portion and the lower portion at a portion of the at least one upper joining plane or the lower joining plane, wherein there is no contact between the upper portion and the lower portion in a region of the at least one solder gap (4, 5);
  d) heating the piston blank to a temporary holding temperature of from 825° C. to 1000° C. in order to homogenize the temperature of the upper and lower portions directly before reaching a actual operating temperature;
  e) heating the piston blank to a temperature of from 1100 to 1200° C. thereby producing a materially engaging solder connection;
  f) cooling the piston blank to a temperature of from 900 to 1000° C.;
  g) continually cooling the piston blank at cooling rates between 0.25 and 5 K/s in order to pass through one of a bainitic region or ferrite/pearlite region; and
  h) stopping the cooling when the piston blank has a temperature of less than 200° C. and at least one of a ferritic/pearlitic or bainitic grain structure is present.

3. The method of claim 2, wherein at least the heating and cooling steps are carried out in a vacuum furnace.

4. The method of claim 2, wherein during at least the assembling and heating steps the lower portion is arranged above the upper portion.

5. The method of claim 2, further comprising:
  forming a pressure compensation element in communication with the at least one solder gap; and
  moving the solder into the at least one solder gap by the pressure compensation element under the action of at least one of a capillary effect or atmospheric pressure.

6. The method of claim 2, wherein the step of assembling the lower portion and the upper portion comprises positioning of the lower portion relative to the upper portion by a centering.

7. A method for producing a piston for use in an internal combustion engine using at least one of a mircoalloyed or bainitic steel, the piston comprising a lower portion and an upper portion defining at least one of upper joining plane which extends through the outer periphery of the piston or a lower joining plane which does not extend through the outer periphery of the piston, and at least one solder gap positioned in a portion of the at least one upper joining plane or the lower joining plane, the method comprising the steps of:
  a) producing a lower portion and an upper portion with at least one of an upper joining plane or a lower joining plane;
  b) applying a solder in a region of the at least one upper joining plane or the lower joining plane;
  c) assembling the lower portion and the upper portion to form a piston blank by producing contact between the upper portion and the lower portion at a portion of the at least one upper joining plane or the lower joining plane, wherein there is no contact between the upper portion and the lower portion in a region of the at least one solder gap;
  d) heating the piston blank to a temporary holding temperature of from 825° C. to 1000° C. in order to homogenize the temperature of the upper and lower portions directly before reaching an actual operating temperature;
  e) heating the piston blank to a temperature of from 1100 to 1200° C. thereby producing a materially engaging solder connection;
  f) cooling the piston blank to a temperature of from 900 to 1000° C.;
  g) continually cooling the piston blank at cooling rates between 0.25 and 5 K/s to an isothermal conversion temperature between 350 and 650° C. with subsequent isothermal maintenance in order to pass through one of a bainitic region or ferrite/pearlite region; and
  h) stopping the cooling when the piston blank has a temperature of less than 200° C. and at least one of a ferritic/pearlitic or bainitic grain structure.

8. The method of claim 7, wherein the isothermal maintenance is carried out for between 5 and 30 minutes.

9. The method of claim 8, wherein the isothermal maintenance is carried out for between 10 and 20 minutes.

10. A method for producing a piston for use in an internal combustion engine using at least one of a mircoalloyed or bainitic steel, the piston comprising a lower portion and an upper portion, defining at least one of upper joining plane which extends through the outer periphery of the piston or a lower joining plane which does not extend through the outer periphery of the piston, and at least one solder gap positioned in a portion of the at least one upper joining plane or the lower joining plane the method comprising the steps of:
  a) producing a lower portion and an upper portion with at least one of an upper joining plane or a lower joining plane;
  b) applying a solder in a region of the at least one upper joining plane or the lower joining plane;
  c) assembling the lower portion and the upper portion to form a piston blank by producing contact between the upper portion and the lower portion at a portion of the at least one upper joining plane or the lower joining plane, wherein there is no contact between the upper portion and the lower portion in a region of the at least one solder gap;
  d) heating the piston blank to a temporary holding temperature of from 825° C. to 1000° C. in order to homogenize the temperature of the upper and the lower portions directly before reaching an actual operating temperature;
  e) heating the piston blank to a temperature of from 1100 to 1200° C. thereby producing a materially engaging solder connection;

f) cooling the piston blank to a temperature of from 900 to 1000° C.;

g) continually cooling the piston blank with cooling gradients between 250 and 10 K/s to an isothermal conversion temperature between 350 and 650° C. with subsequent isothermal maintenance; and h) stopping cooling when the piston blank has a temperature of less than 200° C. and has at least one of a ferritic/pearlitic or bainitic grain structure.

11. A method for producing a piston (50) for use in an internal combustion engine using a precipitation-hardened ferritic/pearlitic steel (AFP steel), the piston comprising a lower portion and an upper portion defining at least one of upper joining plane which extends through the outer periphery of the piston or a lower joining plane which does not extend through the outer periphery of the piston, and at least one solder gap positioned in a portion of the at least one upper joining plane or the lower joining plane the method comprising the steps of:

a) producing a lower portion and an upper portion with at least one of an upper joining plane or a lower joining plane;

b) applying a solder in a region of the at least one upper joining plane or the lower joining plane;

c) assembling the lower portion and the upper portion to form a piston blank by producing contact between the upper portion and the lower portion at a portion of the at least one upper joining plane or the lower joining plane, wherein there is no contact between the upper and lower portion in a region of the at least one solder gap;

d) heating the piston blank to a temporary holding temperature of from 825° C. to 1000° C. in order to homogenize the temperature of the upper and lower portions directly before reaching an actual operating temperature;

e) heating the piston blank to a temperature of from 1100 to 1200° C. thereby producing a materially engaging solder connection;

f) cooling the piston blank to a temperature of from 900 to 1000° C.;

g) continually cooling the piston blank (1) at cooling rates between 5 and 45 K/min in order to pass through one of the bainitic region or ferrite/pearlite region; and h) stopping cooling when the piston blank has a temperature of less than 200° C. and at least one of a ferritic/pearlitic or bainitic grain structure is produced.

12. A method for producing a piston (50) for use in an internal combustion engine using a precipitation-hardened ferritic/pearlitic steel, the piston comprising a lower portion and an upper portion defining at least one of upper joining plane which extends through the outer periphery of the piston or a lower joining plane which does not extend through the outer periphery of the piston, and at least one solder gap positioned in a portion of the at least one upper joining plane or the lower joining plane, the method comprising the steps of:

a) producing a lower portion and an upper portion with at least one of an upper joining plane or a lower joining plane;

b) applying a solder in a region of the at least one upper joining plane or the lower joining plane;

c) assembling the lower portion and the upper portion to form a piston blank by producing contact between the upper portion and the lower portion at a portion of the at least one upper joining plane or the lower joining plane, wherein there is no contact between the upper portion and the lower portion in a region of the at least one solder gap;

d) heating the piston blank to a temporary holding temperature of from 825° C. to 1000° C. in order to homogenize the temperature of the upper and lower portions directly before reaching an actual operating temperature;

e) heating the piston blank to a temperature of from 1100 to 1200° C. thereby producing a materially engaging solder connection;

f) cooling the piston blank to a temperature of from 900 to 1000° C.;

g) continually cooling the piston blank at cooling rates between 5 and 45 K/min to an isothermal conversion temperature between 350 and 650° C. with subsequent isothermal maintenance in order to pass through one of the bainitic region or ferrite/pearlite region; and h) stopping cooling when the piston blank has a temperature of less than 200° C. and at least one of a ferritic/pearlitic or bainitic grain structure is produced.

13. The method of claim 12, wherein the isothermal maintenance is carried out for between 5 and 30 minutes.

14. The method of claim 13, wherein the isothermal maintenance is carried out for between 10 and 20 minutes.

* * * * *